United States Patent [19]
Wilhelmstätter et al.

[11] Patent Number: 5,967,472
[45] Date of Patent: Oct. 19, 1999

[54] HEIGHT-ADJUSTING DEVICE FOR AN ADJUSTING FOOT OF A HOUSEHOLD APPLIANCE

[75] Inventors: Johann Wilhelmstätter, Giengen/Hürben; Helmut Jerg, Giengen; Bernd Schessl, Dillingen; Gerhard Fetzer, Gundelfingen; Michael Hartmann, Höchstädt; Markus Höpfl, Lauingen/Donau; Karl-Heinz Rehm, Dischingen; Rudolf Schmidt, Giengen, all of Germany

[73] Assignee: BSH Bosch und Siemens Hausgeraete GmbH, Munich, Germany

[21] Appl. No.: 08/832,441

[22] Filed: Apr. 3, 1997

[51] Int. Cl.[6] .................................................. F16M 11/24
[52] U.S. Cl. ........................................ 248/188.4; 248/188.2
[58] Field of Search ............................... 248/188.2, 188.4

[56] References Cited

U.S. PATENT DOCUMENTS

| | | | |
|---|---|---|---|
| 1,417,639 | 5/1922 | Sterner | 248/188.4 |
| 3,329,105 | 7/1967 | McPherson | 248/188.2 |
| 3,750,989 | 8/1973 | Bergeson | 248/188.2 X |
| 4,991,805 | 2/1991 | Solak et al. | 248/188.4 |
| 5,398,620 | 3/1995 | Rouch | 248/188.2 X |

FOREIGN PATENT DOCUMENTS

4410554-A1  11/1994  Germany ............................. 248/118.4

*Primary Examiner*—Leslie A. Braun
*Assistant Examiner*—Robert Lipcsik
*Attorney, Agent, or Firm*—Herbert L. Lerner; Laurence A. Greenberg

[57] ABSTRACT

A height-adjusting foot for a household appliance includes an adjuster housing solidly connected to an appliance housing. A vertical threaded shaft is form-lockingly guided in the adjuster housing. A foot plate is connected to the threaded shaft. A nut which is rotatably supported in the adjuster housing and is screwed on the threaded shaft, has an outer periphery with a worm wheel. A worm is rotatably supported in the adjuster housing for driving the worm wheel. An adjusting rod is connected to the worm. Due to reduced expenditures, the costs of the adjusting device are lowered. It can be operated from one side wall of the housing, preferably from the front panel of the household appliance. The adjusting foot does not co-rotate in the adjusting operation.

2 Claims, 1 Drawing Sheet

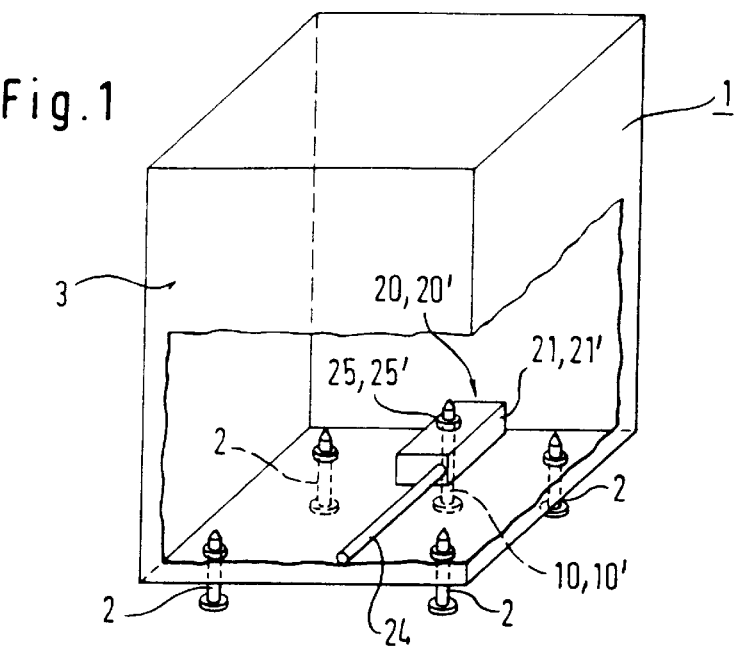
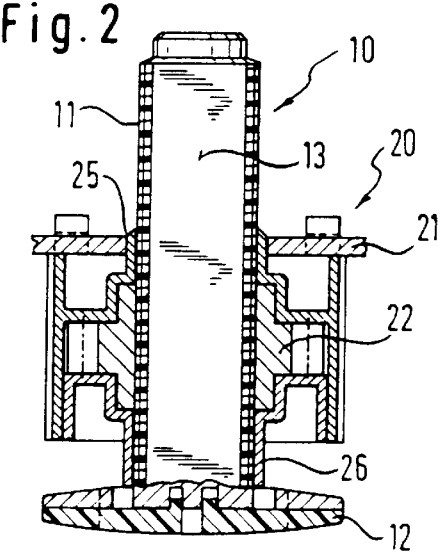
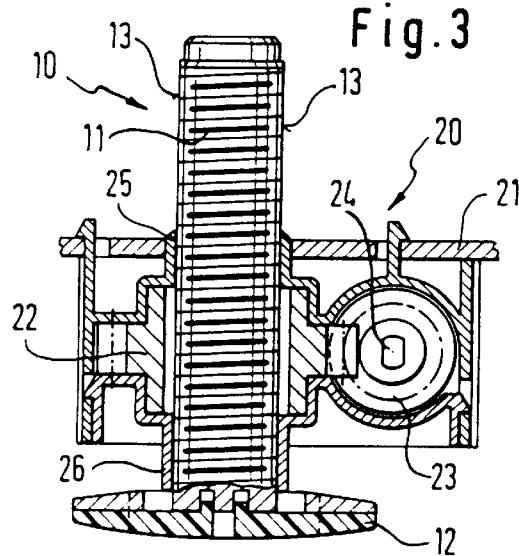
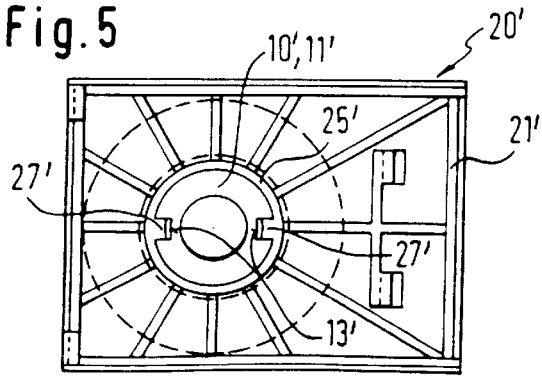
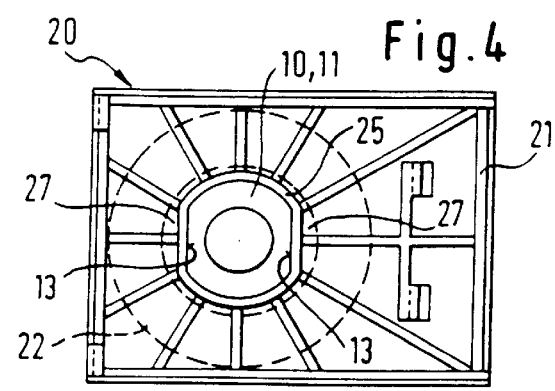

HEIGHT-ADJUSTING DEVICE FOR AN ADJUSTING FOOT OF A HOUSEHOLD APPLIANCE

BACKGROUND OF THE INVENTION

Field of the Invention

The invention relates to a height-adjusting device for an adjusting foot of a household appliance, including a vertical threaded shaft having a foot plate and being guided in an adjuster housing solidly connected to an appliance housing, and a nut rotatably supported in the adjuster housing, screwed to the threaded shaft, having an outer periphery constructed as a worm wheel, being driven by a worm connected to an adjusting rod and being rotatably supported in the adjuster housing.

It has been known for a long time to provide household appliances with adjusting feet, at least one of which is adjustable in height in order to adapt the household appliance that is to be installed to local conditions (see German Published, Non-Prosecuted Patent Application DE-OS 35 01 364, for example).

When household appliances are installed in a closed facade of furniture, such as in a corresponding niche or opening in built-in kitchen cabinets, difficulties arise for the user in gaining access to the adjusting feet disposed in the region of the rear edge of the housing when the installed height of the household appliance is set through the use of the adjustable adjusting feet which, for instance, are set to a precise horizontal and vertical position with the household appliance already inserted into its niche or opening. Thus if the household appliance proves to have been installed in an incorrect position, it may even have to be pushed in and out several times.

In order to make it easier for the user to adjust the height of the adjusting feet disposed in the region of the rear housing edge, it is also known, for instance from German Published, Non-Prosecuted Patent Application DE-OS 43 43 709, to provide one of the adjusting feet in the back with an adjusting device that can be operated from one wall of the housing, preferably the front of the household appliance. A disadvantage of that configuration is that the adjusting foot co-rotates as it is adjusted, and it has been found in practice that especially if it is on a relatively soft floor covering, it can cause damage to the floor covering, and/or extremely high force must be exerted to adjust the adjusting feet.

In order to overcome the aforementioned disadvantage, German Utility Model DE-GM 91 12 657 discloses a height-adjusting device for adjusting feet of the type referred to at the outlet, in which the adjusting foot does not co-rotate upon being adjusted, because of a mandrel in the adjuster housing that protrudes into an opening in the hollow threaded shaft.

That configuration is expensive because of the engineering and production-related expenditure, and since the housing has to fit over the threaded shaft of the adjusting foot, the adjustment range of the adjusting foot is limited.

SUMMARY OF THE INVENTION

It is accordingly an object of the invention to provide a height-adjusting device for an adjusting foot of a household appliance, which overcomes the hereinafore-mentioned disadvantages of the heretofore-known devices of this general type, in which the advantages discussed above are preserved, in which expenditures are lowered because expenses and costs are less and in which the adjusting foot does not co-rotate.

With the foregoing and other objects in view there is provided, in accordance with the invention, a height-adjusting foot for a household appliance, comprising an adjuster housing solidly connected to an appliance housing; a vertical threaded shaft form-lockingly guided in the adjuster housing; a foot plate connected to the threaded shaft; a nut rotatably supported in the adjuster housing and screwed on the threaded shaft, the nut having an outer periphery with a worm wheel; a worm rotatably supported in the adjuster housing for driving the worm wheel; and an adjusting rod connected to the worm.

Since the adjuster housing takes on the task of form-locking guidance of the threaded shaft of the adjusting foot, a height-adjusting device for an adjusting foot of a household appliance is created in a simple way in which while preserving the advantages referred to at the outset, lowers the costs through the use of reduced expenditures, and the adjusting foot does not co-rotate. In a height-adjusting device according to the invention, the adjuster housing can be made substantially smaller, since it need not fit over the threaded shaft. A form-locking connection is one which connects two elements together due to the shape of the elements themselves, as opposed to a force-locking connection, which locks the elements together by force external to the elements.

In accordance with another feature of the invention, the threaded shaft of the adjusting foot at least partially has at least one flat along the thread, which contacts the adjuster housing at least at one point. With this provision, an especially simple form-locking guidance of the threaded shaft in the adjuster housing is successfully achieved.

In accordance with a further feature of the invention, the threaded shaft of the adjusting foot has two flats. The prevention of co-rotation of the adjusting foot in the adjusting process is further improved by the disposition of two flats.

In accordance with an added feature of the invention, the flats are located on opposite sides of the threaded shaft, thus facilitating assembly.

In accordance with an additional feature of the invention, the flats contact the adjuster housing at least at two points, and as a result further security against co-rotation of the adjusting foot is created.

In accordance with yet another feature of the invention, the flats extend over the entire length of the threaded shaft, so that the form-locking guidance is assured over the entire path of adjustment.

In accordance with yet a further feature of the invention, the threaded shaft of the adjusting foot is equipped with at least one axially extending groove, thus once again creating a very simple embodiment of the form-locking guidance according to the invention.

In accordance with yet an added feature of the invention, the threaded shaft of the adjusting foot is equipped with two grooves, which further improves the prevention of co-rotation of the adjusting foot in the adjusting process.

In accordance with yet an additional feature of the invention, the grooves are located on opposite sides of the threaded shaft, which facilitates assembly.

In accordance with again another feature of the invention, the adjuster housing has at least one outlet opening for the threaded shaft of the adjusting foot, which is constructed in a shape adapted to the cross section of the threaded shaft.

Due to its length, the threaded shaft leaves the adjuster housing not only at the point opposite the floor but also at a point opposite the foot plate, so that a form-locking guidance in the manner described above can be achieved without additional expense at both of these points.

In accordance with again a further feature of the invention, the household appliance is equipped with at least three adjusting feet, two of the adjusting feet being disposed on the front of the household appliance and one adjusting foot being disposed on the back of the household appliance, and the adjusting foot disposed on the back is adjustable in height from one side wall of the household appliance, using the height-adjusting device. With the disposition of only one adjusting foot with an adjusting device that can be used from one side wall of the housing, the expenditures involved in a household appliance and thus the costs are lowered.

In accordance with again an added feature of the invention, in order to expand the adjustability, at least one of the adjusting feet located on the front of the household appliance is adjustable in height.

In accordance with again an additional feature of the invention, the adjusting foot located on the back of the household appliance is located approximately in the middle of a lower rear housing edge of the household appliance. Due to the disposition of the rear adjusting foot approximately in the middle of the lower rear housing edge, a bearing surface with the outline of an approximately isosceles triangle, which is the stablest load-bearing form of a three-point contact, is created.

In accordance with a concomitant feature of the invention, one further adjusting foot is disposed on the back of the household appliance in each of the corner regions of the household appliance. The user thus advantageously has the opportunity, with the four adjusting feet each disposed in the region of the outer lower housing edges, of making a preadjustment before the final installation of the household appliance in a furniture facade, for instance in a corresponding niche or opening in a built-in kitchen cabinet, and then of optionally performing a final adjustment of the installed position through the use of the fifth adjusting foot through its adjusting device, thereby avoiding pushing the household appliance in and out again or repeatedly. That is, if the preadjustment proves to be correct even for the final installation site, then the household appliance rests on four adjusting feet, but if the preadjustment through the use of the fifth adjusting foot has to be changed later, a three-point contact is created. Due to the disposition of the fifth adjusting foot approximately in the middle of the lower rear housing edge, a bearing surface with the outline of an approximately isosceles triangle, the stablest load-bearing form of a three-point contact, is created when the fifth foot is used.

Other features which are considered as characteristic for the invention are set forth in the appended claims.

Although the invention is illustrated and described herein as embodied in a height-adjusting device for an adjusting foot of a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, partly broken-away, perspective view of a household appliance with a height-adjusting device according to the invention for an adjusting foot;

FIG. 2 is an enlarged, sectional view as seen from the side of an adjuster housing of the height-adjusting device according to the invention for an adjusting foot;

FIG. 3 is a sectional view as seen from the front of an adjuster housing of the height-adjusting device according to the invention for an adjusting foot;

FIG. 4 is a plan view of the height-adjusting device according to the invention for an adjusting foot in accordance with a preferred embodiment of the invention; and FIG. 5 is a plan view of the height-adjusting device according to the invention for an adjusting foot in accordance with a further embodiment of the invention.

DESCRIPTION OF THE PREFERRED EMBODIMENTS

Referring now to the figures of the drawings in detail and first, particularly, to FIG. 1 thereof, there is seen a housing 1 of a household appliance which is equipped in the illustrated exemplary embodiment with five adjusting feet 2, 10, 10' that are adjustable in height. Four of the adjusting feet 2 are each disposed in the vicinity of a respective outer, lower housing edge. These adjusting feet 2 are screwed into a non-illustrated female thread or mounted on the housing 1 in a manner which is known per se through the use of a non-illustrated threaded rod and are adjustable in height by being manually rotated inward and/or outward.

The fifth adjusting foot 10, 10' is located approximately in the middle of the rear lower housing edge and is adjustable in height through the use of a height-adjusting device 20, 20' according to the invention, which can be adjusted from the front panel of the household appliance in the illustrated exemplary embodiment. This adjusting foot 10, 10' includes a threaded shaft 11, 11' and a foot plate 12 firmly joined thereto, as is seen in FIGS. 2–4.

In both illustrated exemplary embodiments, the threaded shaft 11, 11' is guided vertically in a adjuster housing 21, 21' of the height-adjusting device 20, 20' of the invention. The adjuster housing 21, 21' is solidly attached to the housing 1. A nut 22 which is rotatably supported in the adjuster housing 21, 21' is screwed onto the threaded shaft 11, 11'. An outer periphery of the nut 22 is constructed as a worm wheel and is driven by a worm 23 that is connected to an adjusting rod 24 and is rotatably supported in the adjuster housing 21, 21'.

The adjusting rod 24 is guided in the housing 1 of the household appliance in a non-illustrated manner and extends as far as a front panel 3 of the household appliance where, for instance, it has a slit for a screwdriver, a polygon for an open-end wrench or the like, so that the user can operate the height-adjusting device 20, 21' of the invention.

According to the invention, the threaded shaft 11 of the adjusting foot 10 is form-lockingly guided in the adjuster housing 21 to prevent co-rotation of the adjusting foot 10 in the adjusting process. In the preferred exemplary embodiment shown in FIGS. 2, 3 and 4, this has been achieved by providing that the threaded shaft 11 has two flats 13, located on opposite sides, which contact the adjuster housing 21 at two points, namely at an upper outlet opening 25 and at a lower outlet opening 26. In order to achieve the form-locking guidance, the outlet openings 25, 26 are constructed with a form adapted to the cross section of the threaded shaft 11. Adapting the form of the outlet openings 25, 26 to the cross-sectional shape of the threaded shaft 11 is effected by intersecting the circular shape of the outlet openings 25, 26 through the use of opposed circular segments 27 with rectilinear chords, as can be seen best in FIG. 3. The flats 13 extend over the entire length of the threaded shaft 11.

FIG. 5 shows a plan view of a height-adjusting device 20' according to another embodiment of the invention, in which the form-locking guidance according to the invention of the threaded shaft 11' of the adjusting foot 10' is realized by providing that the threaded shaft 11' has grooves 13' on opposite sides. Protrusions 27' projecting from the upper outlet opening 25' and from the non-illustrated lower outlet opening, in each case protrude into the grooves 13' toward the threaded shaft 11'.

According to the invention, the form-locking guidance of the threaded shaft 11, 11' of the adjusting foot 10, 10' in the adjuster housing 21 creates a height-adjusting device 20, 20' for an adjusting foot 10, 10' of a household appliance in a simple way. The use of the height-adjusting device results in reduced expenditures causing the costs to be lowered. Additionally, the height-adjusting device can be operated from one side wall of the housing, preferably the front panel 3 of the household appliance, and the adjusting foot 10, 10' is not co-rotated. When the household appliance is installed, the user makes a preadjustment with the four adjusting feet 2 disposed in the region of the outer lower housing edges, before the final installation of the household appliance, for instance in a front furniture panel, such as a corresponding niche or opening in a built-in kitchen cabinet. The household appliance is subsequently moved to the final installation site, for instance by being pushed into the niche or opening. The user then checks the installed position of the household appliance and while avoiding pushing it in and out again repeatedly, performs an optional final adjustment of the installed position through the use of the fifth adjusting foot 10, 10', with its adjusting device 20, 21'. The household appliance can be selectively installed on either four or three adjusting feet 2, 10, 10'. If the preadjustment proves to be correct for the final installation site as well, then the installation on four adjusting feet 2 is retained. However, if the preadjustment should have to be changed later through the use of the fifth adjusting foot 10, 10', then an installation on three adjusting feet 2, 10, 10' or in other words a three-point contact, comes about. Since the fifth adjusting foot 10, 10' is located approximately in the middle of the lower rear housing edge, a contact having the outline of an approximately isosceles triangle, the stablest bearing form of a three-point contact, exists in that case.

We claim:

1. A household appliance comprising:

a housing having a front, a back and walls, said back of said housing having a pair of corner regions and a lower rear housing edge with a middle; and a height adjusting assembly including:

five adjusting feet, two of said adjusting feet disposed at said front of said housing, one of said adjusting feet disposed approximately in said middle of said lower rear housing edge of said back of said housing, and one further of said adjusting feet disposed in each respective said corner region of said back of said housing;

said adjusting foot disposed in said middle of said back of said housing including:

an adjuster housing solidly connected to said appliance housing;

a vertical threaded shaft form-lockingly guided in said adjuster housing;

a foot plate connected to said threaded shaft;

a nut rotatably supported in said adjuster housing and screwed on said threaded shaft, said nut having an outer periphery with a worm wheel;

a worm rotatably supported in said adjuster housing for driving said worm wheel; and an adjusting rod connected to said worm for adjustment from one of said walls of said housing.

2. The household appliance according to claim 1, wherein at least one of said adjusting feet located at said front of said housing is adjustable in height.

* * * * *